US007315865B1

(12) United States Patent
Jernigan, IV

(10) Patent No.: US 7,315,865 B1
(45) Date of Patent: Jan. 1, 2008

(54) METHOD AND APPARATUS FOR VALIDATING A DIRECTORY IN A STORAGE SYSTEM

(75) Inventor: Richard P. Jernigan, IV, Ambridge, PA (US)

(73) Assignee: Network Appliance, Inc., Sunnyvale, CA (US)

( * ) Notice: Subject to any disclaimer, the term of this patent is extended or adjusted under 35 U.S.C. 154(b) by 486 days.

(21) Appl. No.: 10/856,026

(22) Filed: May 27, 2004

(51) Int. Cl.
*G07F 17/30* (2006.01)
(52) U.S. Cl. .............................. 707/102; 707/2; 707/3; 707/10; 707/103 R
(58) Field of Classification Search .................. 707/2, 707/10, 102, 103 R, 104.1; 711/162; 709/203, 709/219
See application file for complete search history.

(56) References Cited

U.S. PATENT DOCUMENTS 6,292,795 B1* 9/2001 Peters et al. .................... 707/3
2001/0027450 A1* 10/2001 Shinoda et al. ................ 707/1

* cited by examiner

*Primary Examiner*—Shahid Alam
*Assistant Examiner*—Alex Gofman
(74) *Attorney, Agent, or Firm*—Blakely Sokoloff Taylor & Zafman LLP

(57) ABSTRACT

A method and a corresponding apparatus are described, where the method includes storing, in a processing system, an information set that includes a plurality of items in hierarchical relationships, each of the items containing information. The plurality of items are grouped to form a plurality of subsets of the information set. One of the plurality of subsets is identified, for which a known memory availability limit will not be exceeded when a predetermined test is subsequently performed on the identified subset. The predetermined test is then performed on the identified subset. The identification of a subset and performing of the predetermined test may be repeated for different subsets of the information set, so that all of the subsets in the information set have been tested.

26 Claims, 16 Drawing Sheets

METHOD AND APPARATUS FOR VALIDATING A DIRECTORY IN A STORAGE SYSTEM

FIELD OF THE INVENTION

At least one embodiment of the present invention pertains to storage systems, and more particularly, to a method and apparatus for testing a directory in a storage system.

BACKGROUND

A storage server is a special-purpose processing system which is used to store and retrieve data on behalf of one or more client processing systems ("clients"). A storage server can be used for many different purposes, such as to provide multiple users with access to shared data or to back up mission critical data.

A file server is one example of a storage server. A file server operates on behalf of one or more clients to store and manage shared files in a set of mass storage devices, such as magnetic or optical storage based disks or tapes. The mass storage devices are typically organized into one or more volumes of Redundant Array of Inexpensive Disks (RAID).

A file server typically includes a file system, which is software that keeps track of all of the data stored by the file server and manages read/write operations on the data. The term "file system" can also be used to refer to the actual structure of the stored data. The files within a file server are generally stored within a hierarchy of directories. A directory is simply a software-based entity which can contain information, such as one or more files, other directories and/or other data, and which is used to organize stored information.

Any data stored in a computer system has the potential to become corrupted, including the data which represents the directory structure in a file system. Undetected errors in the directory structure of a storage server can cause critical loss of data and/or downtime. Therefore, in storage servers, particularly those which store data on a very large-scale, it is desirable to have a way to test the directories in the file system for errors, to allow correction of such errors before significant damage can occur.

A storage server, such as a file server, can keep track of stored data by using inodes. An inode is a data structure, stored in an inode file, that keeps track of which logical blocks of data in a storage pool are used to store a file. In certain file servers, each stored file is represented by a corresponding inode. A directory is, at its most fundamental level, a mapping between filenames and inode indices.

For example, if a user has created a file called "hello" within a directory and later tries to read that file, the file system has to know that "hello" is stored in, for example, inode #36 in the inode file. Likewise, if the user creates a subdirectory called "private", then the file system has to know that the subdirectory is stored in, for example, inode #122 in the inode file. The directory structure maintains these mappings. A file server generally includes many such directories.

In one prior art file server, each directory is stored in the form of one or more 4-kbyte blocks, stored in various places in the storage pool. To create the directory structure, each of those 4-kbyte blocks are divided into two 2-kbyte "segments". There are two types of segment: name segments and tree segments. Each directory has at least one name segment and at least one tree segment. Name segments contain the basic mappings between filenames and inode numbers, while tree segments are used to accelerate filename lookups. Each tree segment points to some number of name segments and, in some cases, to one or more other tree segments. Two 2-kbyte segments fit into every 4-kbyte block. Note the distinction here between a directory and the information (e.g., files) contained in the directory: what is being described here is the manner in which the directory itself is represented in the storage pool, not the information contained in the directory.

A directory has at least one tree segment and at least one name segment. The tree segment or segments of the directory form a hierarchical structure referred to as a radix tree. The radix tree is a device used to accelerate lookups of filenames in the directory. As shown in example of FIG. 1, multiple tree segments 2 can make up a radix tree 1 of a directory. The radix tree of a directory always includes at least a root tree segment T1 and may also include one or more other tree segments 2. The root tree segment T1 references the other tree segments 2 either directly or indirectly. Each tree segment 2 refers to some number of name segments (not shown).

A directory can become very large, so as to be represented on disk by a very large radix tree with many segments. Large directories can present problems, however, for purposes of directory testing and validation, especially in a very large storage pool. One known prior art file server uses a directory structure such as described above (radix trees of name segments and tree segments) and includes a software utility to perform testing and validation of directories. The prior art testing algorithm generally batches together all of the name segments under a given tree segment, performs validation on those names, then repeats the process for each tree segment in the directory, and then further repeats this process for each directory in the storage pool.

One problem with this approach is that many directories are too large to store in main memory in their entirety (i.e., including all of their name segments). Consequently, many disk read operations ("I/Os") are required to access the directory information (segments) on disk during directory validation. Disk I/Os tend to involve high latency in comparison to accessing main memory. This problem is exacerbated by very large directories and very large storage pools. As a result of disk I/O latency, the process of testing and validating all directories can take hours or even days for a very large storage pool.

SUMMARY OF THE INVENTION

The present invention includes a method and a corresponding apparatus, where the method includes storing, in a processing system, an information set that includes a plurality of items in a hierarchy, each of the items containing information. The plurality of items are grouped to form a plurality of subsets of the information set, based on an amount of memory required to perform a predetermined test on each subset. One of the plurality of subsets is selected, and then the predetermined test is performed on only the selected subset.

The selection of a subset and performing of the predetermined test may then be repeated for different subsets of the information set, until all of the subsets in the information set have been processed in this way.

Other aspects of the invention will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

Figure 12:
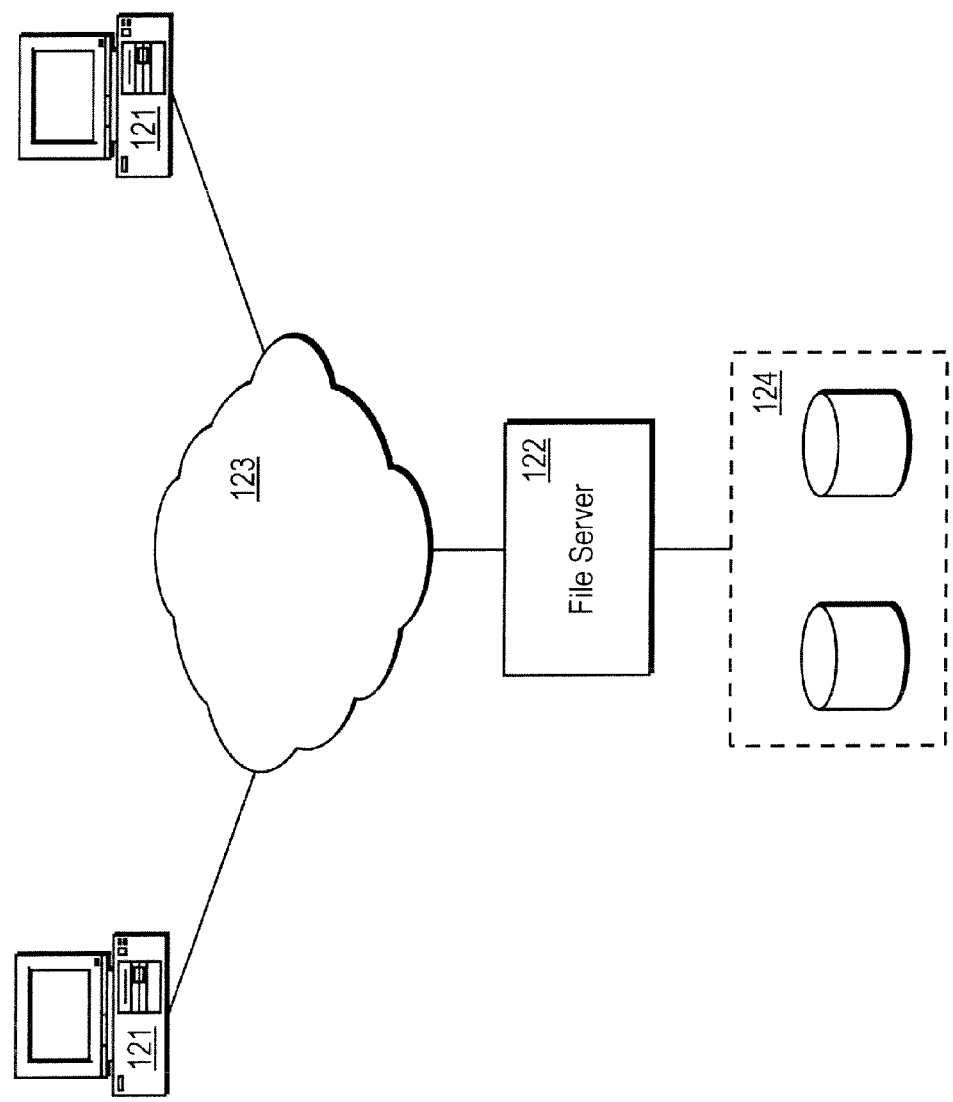
FIG. 12 shows an example of a network environment in which a file server that implements the invention can be used.
Figure 13:
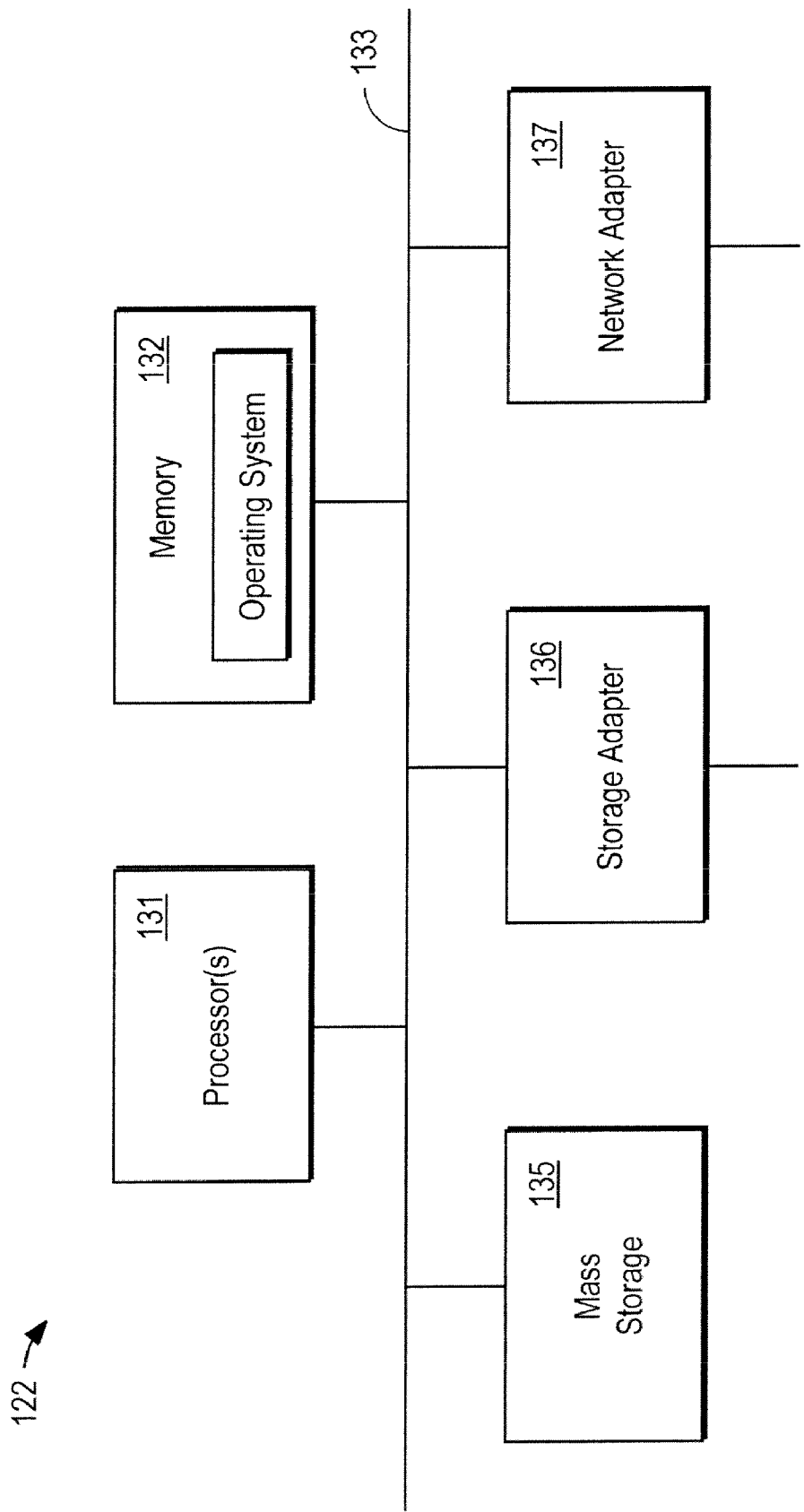
FIG. 13 is a block diagram showing the architecture of a file server that can implement the invention.

A method and apparatus for validating a directory of information stored in a storage server are described. To facilitate description, it is assumed that the validation technique is implemented in a file server. A file server 122 in which the invention can be implemented is shown in FIGS. 12 and 13 and is described below.

Figure 1:
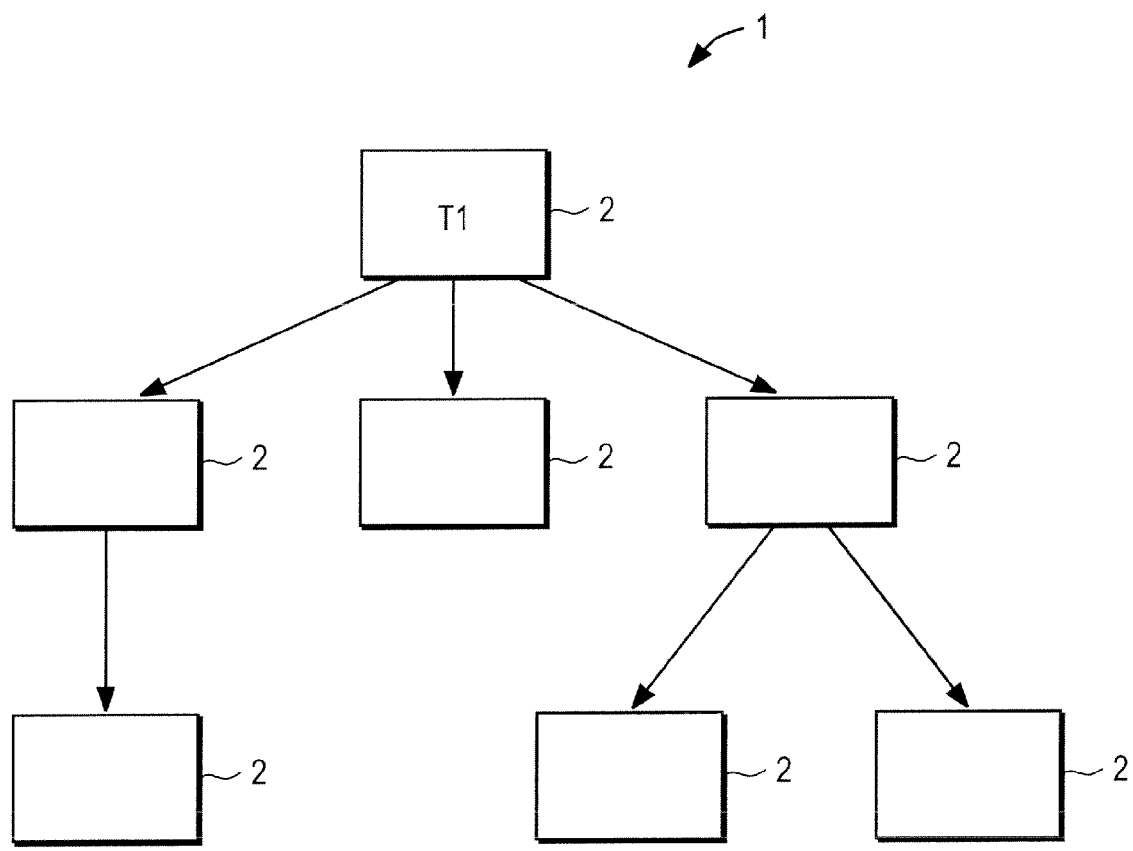
FIG. 1 illustrates a radix tree representing a directory in a storage system.

To facilitate description, it is further assumed that the validation technique is applied to a storage pool in which each directory is stored in the manner described above. That is, each directory is stored as one or more 4-kbyte blocks, stored in various places in the storage pool. Each of the 4-kbyte blocks is divided into two 2-kbyte segments, including at least one name segment and at least one tree segment. Name segments contain the basic mappings between filenames and inode numbers. A filename always resides entirely within a single name segment. Tree segments point to name segments and, in some cases, other tree segments, and are used to accelerate filename lookups. A directory has at least one tree segment and at least one name segment. The tree segments of the directory form a hierarchical structure referred to as a radix tree, an example of which is shown in FIG. 1, which is used to accelerate lookups of filenames in the directory.

As a result of disk I/O latency, for a very large storage pool the process of validating all directories can take hours or even days. The technique introduced herein addresses this problem. In accordance with embodiments of the invention, a specified validation test is to be performed on each name in a directory (a specific example of such a test is described below). The types of input information needed to perform this test for each name are known. From this knowledge, the maximum amount of memory required to store that information for each name can also be readily determined, as described further below. It is further assumed that the amount of space available in main memory for storing such information of the file server is also known.

In accordance with embodiments of the invention, therefore, each directory's radix tree is divided up (logically) to define one or more subsets of the radix tree. Each subset is defined as one or more of the radix tree's tree segments. The subsets are defined based on the number of names under each tree segment. More specifically, the subsets are defined so that, for each subset, all of the information required to perform the validation test on all names within the subset can be stored at one time in main memory of the file server (considering the amount of memory space available). The validation test involves verifying that the tree segments' indexing of information stored in the name segments agrees with the information actually stored in the name segments.

To perform the test, for each subset the required input information is first placed into a special object for each name in the subset, called a name info object, which is stored in main memory. A separate name info object is created for each name which should be hashed under that subset. The validation test is then performed on all of the names in the subset from the corresponding name info objects stored in main memory, without having to perform any further disk I/Os to test the names in that subset.

This approach reduces the number of disk I/Os required when testing a directory, resulting in an overall reduction in latency. For very large storage pools, this approach can yield a substantial reduction in the overall time required to test all directories in the file system.

Figure 2:
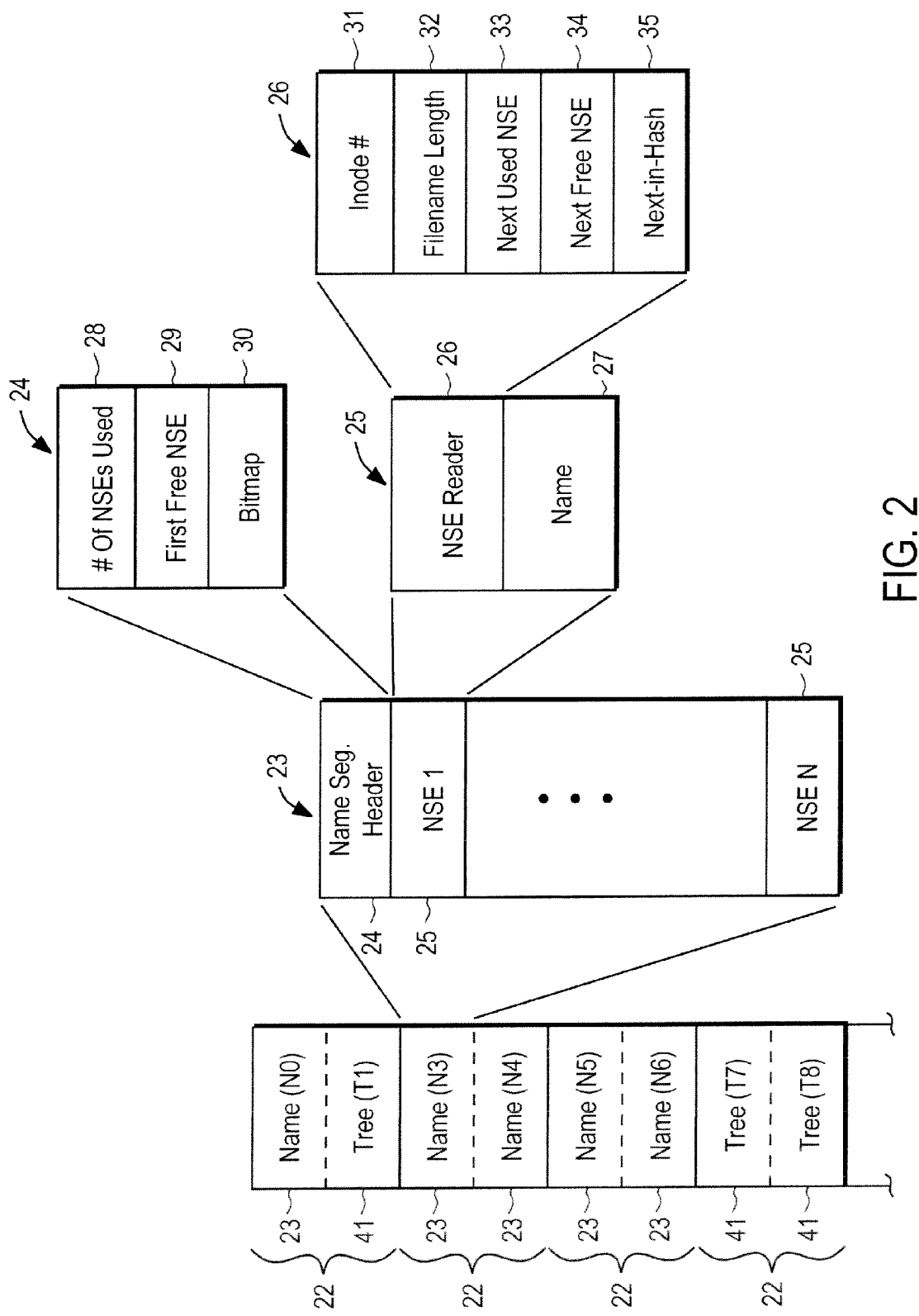
FIG. 2 illustrates the content and format of a name segment.

Before describing this validation technique in greater detail, it is useful to further describe an approach to implementing directories. Referring first to FIG. 2, each directory in a storage pool is represented as one or more 4-kbyte blocks 22. The first 4-kbyte block includes one name segment followed by one tree segment. A newly-created directory has exactly this one block and is, therefore, 4 kbytes in size. Thereafter, the directory 21 can be extended by adding additional 4-kbyte blocks 22 when necessary: either two name segments or two tree segments (i.e., one block) are added at a time. Every segment in a directory is assigned an index: for example, the first name segment 23 is segment #0, the first tree segment 41 is segment #1, the second name segment is segment #3, and so on.

As shown in FIG. 2, each name segment 23 includes a name segment header 24 followed by a number (N) of name segment entries (NSEs) 25. Each NSE 25 can contain at least a portion of a name (and NSE 25 can contain an entire name if the name is small enough to fit in the NSE). Hence, each name segment 23 can potentially store up to N names. In certain embodiments of the invention, there are 63 NSEs in each name segment. In some such embodiments, each NSE 25 is 32 bytes and is split into two halves: a 16-byte NSE header 26 and a 16-byte text area 27 for storing at least a portion of a filename. Although a filename always resides entirely within a single name segment 23, depending on its length it may be distributed amongst multiple NSEs 25 within a name segment 23.

The name segment header 24 includes: a field 28 indicating the number of NSEs 25 in use in that name segment; a field 29 indicating the first free NSE in that name segment; and a bitmap 30 of starting entries, indicating which NSE(s) in that name segment include the beginning of a new filename. The NSE header 26 in a NSE 25 includes a field 31 containing the inode number of the file whose name is contained in this name segment; a field 32 containing the length of the filename; a field 33 indicating the next used NSE in this name segment (if applicable); a field 34 indicating the next free NSE in this name segment (if applicable), and a next-in-hash field 35 (if applicable).

An example of how this structure is used will now be provided. Assume someone creates a new directory, then creates a file named "my beautiful new file.txt" within it. If the new file is assigned inode #99, then the first name segment's contents will appear as follows:

```
[Name Segment Header
    [ entries in use: 2 ]
    [ first free entry: NSE #3 ]
    [ bitmap of starting entries: 10000000000 ] ]
[ NSE #1
    [ NSE header
        [ inode 99 ]
        [ filename length: 25 chars ]
        [ continues with NSE #2 ] ]
    [NSE filename
        [ "my beautiful new" ] ] ]
[NSE #2
    [NSE header
        [ still mode 99 ] ]
    [NSE filename
        ["file.txt" ] ] ]
[NSE #3
    [NSE header
        [ nextfree entry: #4 ] ]
    [NSE filename
        [ contents irrelevant; entry is unused ] ] ]
[NSE#4
    [NSE header
        [ next free entry: #5 ] ]
    [NSE filename
        [ contents irrelevant; entry is unused ] ] ]
...
```

The filename in this example is too long to store in a single NSE 25, so the first 16 bytes of filename ("my beautiful new") were stored in one NSE 25, and the remaining text ("file.txt") was stored in another NSE 25. A filename can be up to 1000 characters in length in this embodiment, and so can consume all 63 NSEs 25 in a name segment 23. Thus, a filename always resides entirely within a single name segment 23, but can be split between NSEs 25 in a given name segment 23.

At any time a given NSE 25 in a name segment 23 may or may not be in use. In order to add a new filename to a name segment 23, the file system must be able to quickly find all of the NSEs 25 in that name segment that are unused. The file system does this by maintaining a free list pointer ("first free NSE") 29 in the name segment header 24 of each name segment 23. The free list pointer 29 is a value which is the index of the first unused NSE 25 within that name segment 23. Further, each unused NSE 25 has, in its NSE header 26, a pointer 34 to the next unused NSE, thus forming a chain of free NSEs 25. When the file system needs to allocate one or more new NSEs 25, it pulls them from the head of this free chain and then adjusts the name segment header's free list pointer 29 to skip those entries. Conversely, when removing a name from the directory, the file system simply adds the NSE(s) 25 which contained the name to the head of the free NSE chain.

Figure 3:
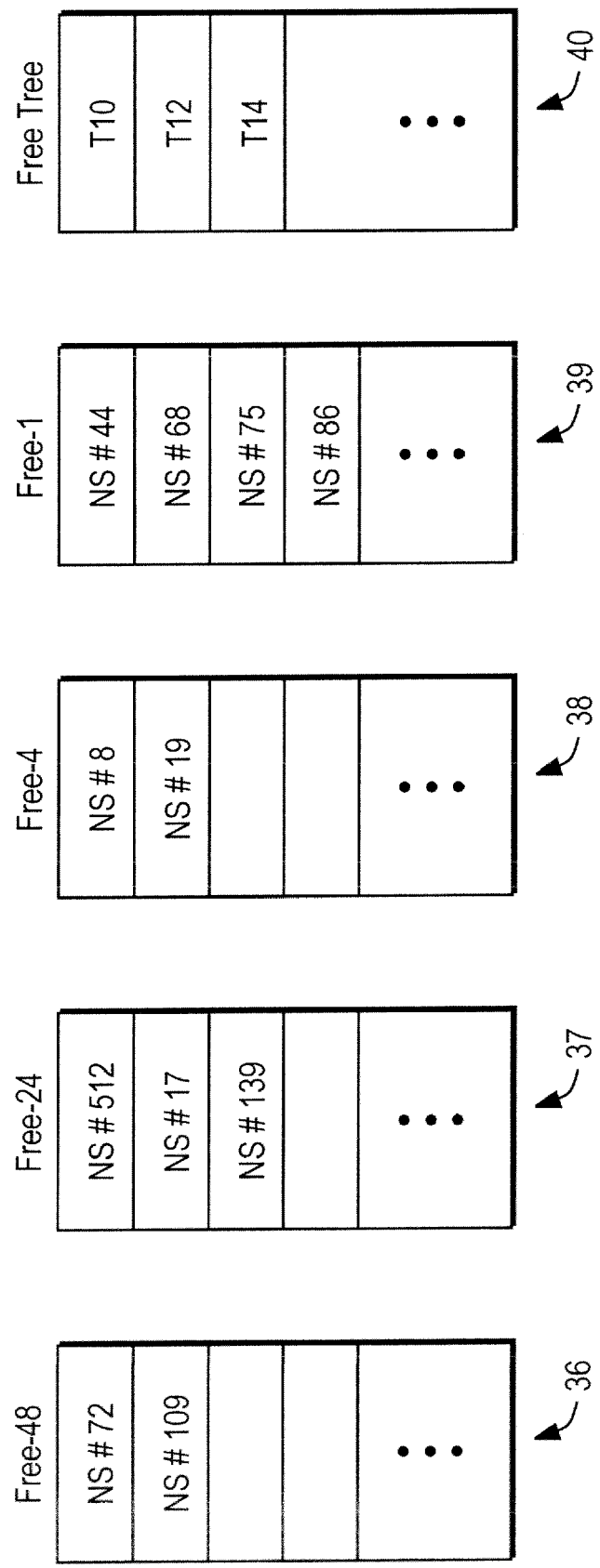
FIG. 3 illustrates a set of free lists used by a file server.

In a typical directory 21 in a file server, there are many name segments 23, which are in various states of being full of names or empty or somewhere in between. When the file system needs to add a new filename, it first has to find a name segment 23 (quickly) that can hold the filename. Therefore, in at least one embodiment of the invention, there are four free lists 36-39, shown in FIG. 3, which keep track of which name segments 23 have some space available for storing filenames. If a name segment 23 is entirely full, it will not to appear on any of these four free lists; otherwise, it should show up on exactly one free list. The four free lists 36-39 include a first free list, "free-48", representing name segments that have 48 or more free NSEs, a second free list, "free-24", representing name segments that have 24 or more free NSE, a third free list, "free-4", representing name segments that have four or more free NSEs, and a fourth free list, "free-1", representing name segments that have at least one free NSE.

So for example, when adding a 45-character filename to a directory, the file system will require three NSEs (45/16, rounded up). Therefore, the file system accesses the first name segment 23 on the free-4 name segment free list; the file system knows that any name segments 23 on this free list have at least four free NSEs 25 (which is plenty for this example, since only three are needed). If the file system needed 18 NSEs, it would instead look at the free-24 free list, and so on.

Assume the file system found a name segment with six free NSEs: this name segment would have been listed on the free-4 free list (since it had at least four free NSEs, but less than 24 free NSEs). The file system consumes three NSEs to write the new filename, after which there are only three free NSEs left in that name segment. The name segment no longer qualifies, therefore, to be listed on the free-4 free list, so it is removed and reinserted at the front of the free-1 free list. The directory header also has a free list 40, which threads together all the tree segments that are unused, so that it can quickly allocate a new tree segment later whenever it needs to.

Figure 4:
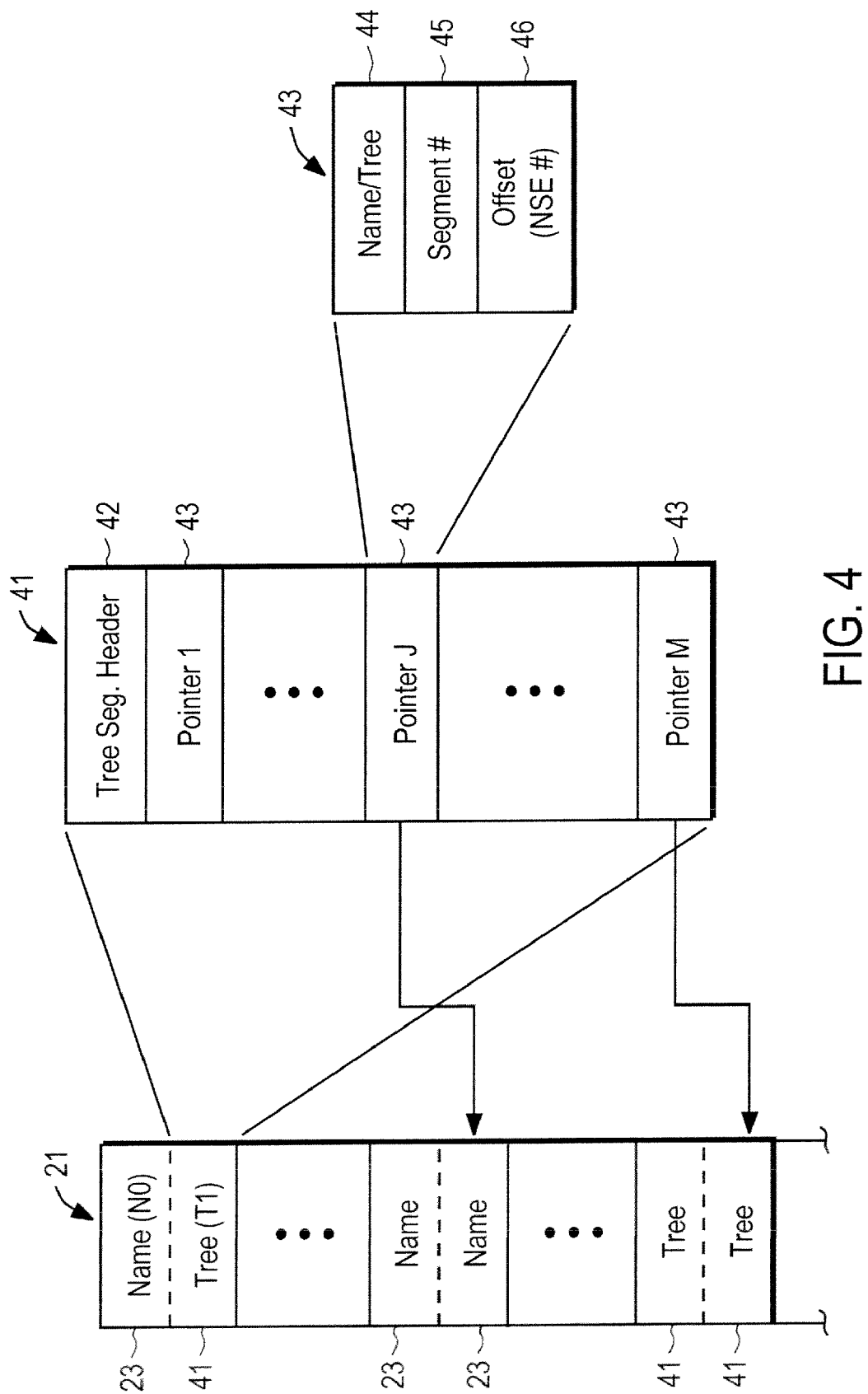
FIG. 4 illustrates the format and content of a tree segment.
Figure 9:
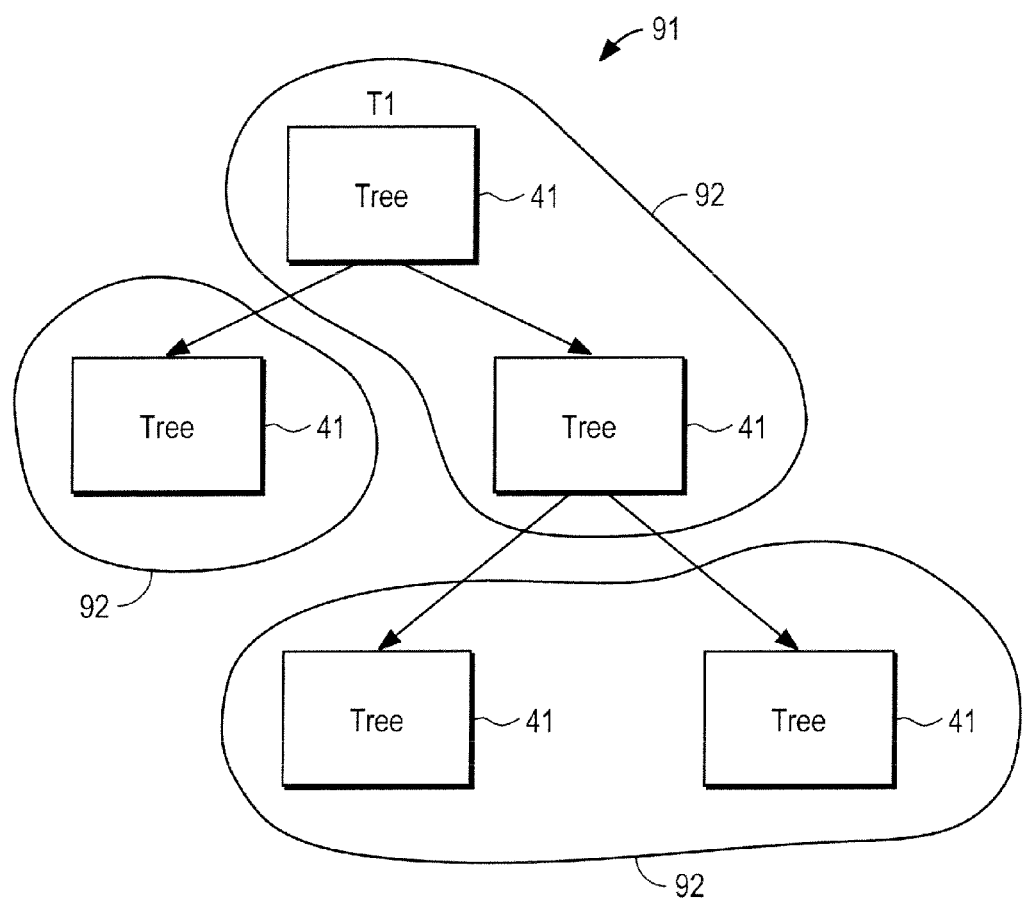
FIG. 9 shows an example of dividing a radix tree of a directory into subsets.

FIG. 4 shows an example of the format of a tree segment. The one or more tree segments 41 of a directory collectively form a radix tree, an example of which is shown in FIG. 9. The radix tree is an information set that is used to accelerate lookups of filenames in the directory. In certain embodiments of the invention, the radix tree for any directory has a maximum depth of three elements. The first tree segment 41 in a directory 21 is the root of the tree, and is designated as T1. Until the directory 21 becomes large, the root tree segment T1 will be the only node in the tree.

As shown in FIG. 4, each tree segment 41 has a tree segment header 42 and a number (M) of pointers 43, each of which can refer either to a filename (for example, "go to name segment 5, NSE 12") or to another tree segment (for example, "go to tree segment 72"), thus forming a recursive lookup tree. In certain embodiments of the invention, there are 510 pointers 43 in each tree segment 41. Each pointer 43 contains a name/tree indicator 44 indicating whether the pointer 43 points to an NSE 25 or to another tree segment 41; a segment number 45 indicating the index of the segment to which the pointer 43 points; and an offset 46 representing the NSE index if the pointer 43 points to an NSE 25.

Figure 5:
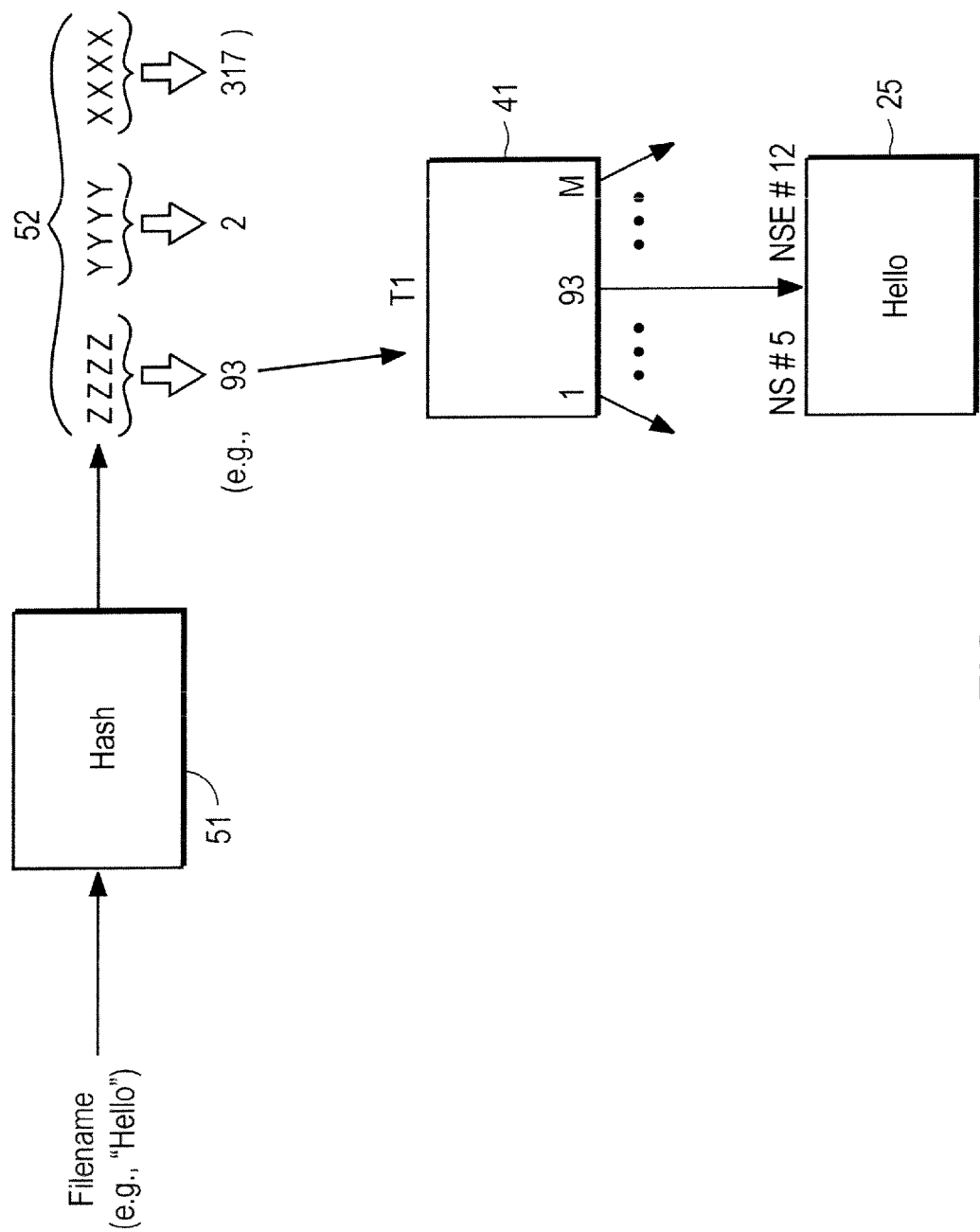
FIGS. 5 through 7 illustrate the use of a hash chain in looking up a filename.

Referring now to FIG. 5, when looking up a filename, the file system first hashes the filename through a hashing function 51. This operation produces, from the filename, a number with a high degree of distribution. For example, "hello" might hash to 1923810293, while only a slightly different name "hallo" might hash to 412. The hash function 51 may be, for example, a CRC hash. In accordance with certain embodiments of the invention, the file system splits that resulting hash value 52 into three multi-bit parts of equal length: the lowest order P bits (where P is a predetermined number), the next-lowest-order P bits, and the highest-order P bits, representing three lookup values. The first lookup value (i.e., the highest-order P bits), "93" in the example of FIG. 5, is used as an index into the root tree segment, T1

(which resides in the first block of the directory). In this example, the root tree segment's pointer #93 refers to name segment #5, NSE #12, which contains the filename "hello". Once the filename is located in this way, the system returns the information the caller wanted for the filename.

Figure 6:
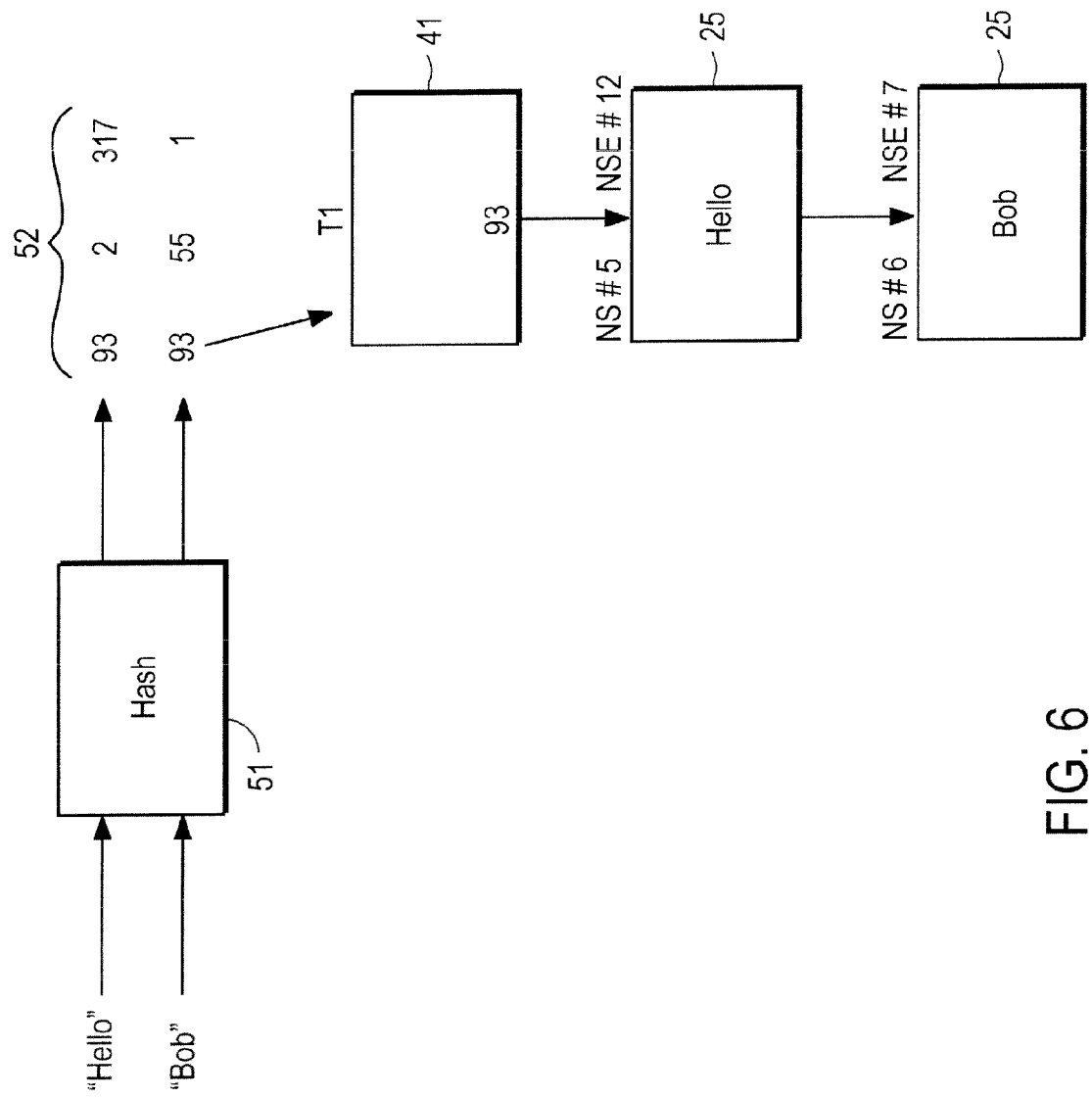

It is possible for two filenames to receive the same hash values. For example, assume "hello" has "93" as its first hash value, but so does the filename "Bob". Assume also that both of these filenames exist in the same directory. In that event, when attempting to look up the filename "Bob", the root tree segment's pointer #93 points to name segment #5, NSE #12, but name segment #5, NSE #12 contains "hello", not "Bob". However, NSE #12 also includes in its NSE header a "next-in-hash" field 35 (see FIG. 2), which is a pointer to follow if the desired filename has not found in that NSE. In this example, the next-in-hash pointer in the NSE header for "Hello" points to name segment #6, NSE #7, which is where the filename "Bob" is found, as shown in FIG. 6. Thus, the "next-in-hash" pointers form a hash chain that the file system can follow until the desired filename is found.

Walking through a "hash chain" in this way is typically a very slow process. It is not desirable to have to do this often, because each time it is done it is necessary to jump around to a new name segment, read a name and compare it against the desired name. The radix tree structure of a directory becomes relevant in this regard, as will now be further explained.

Figure 7:
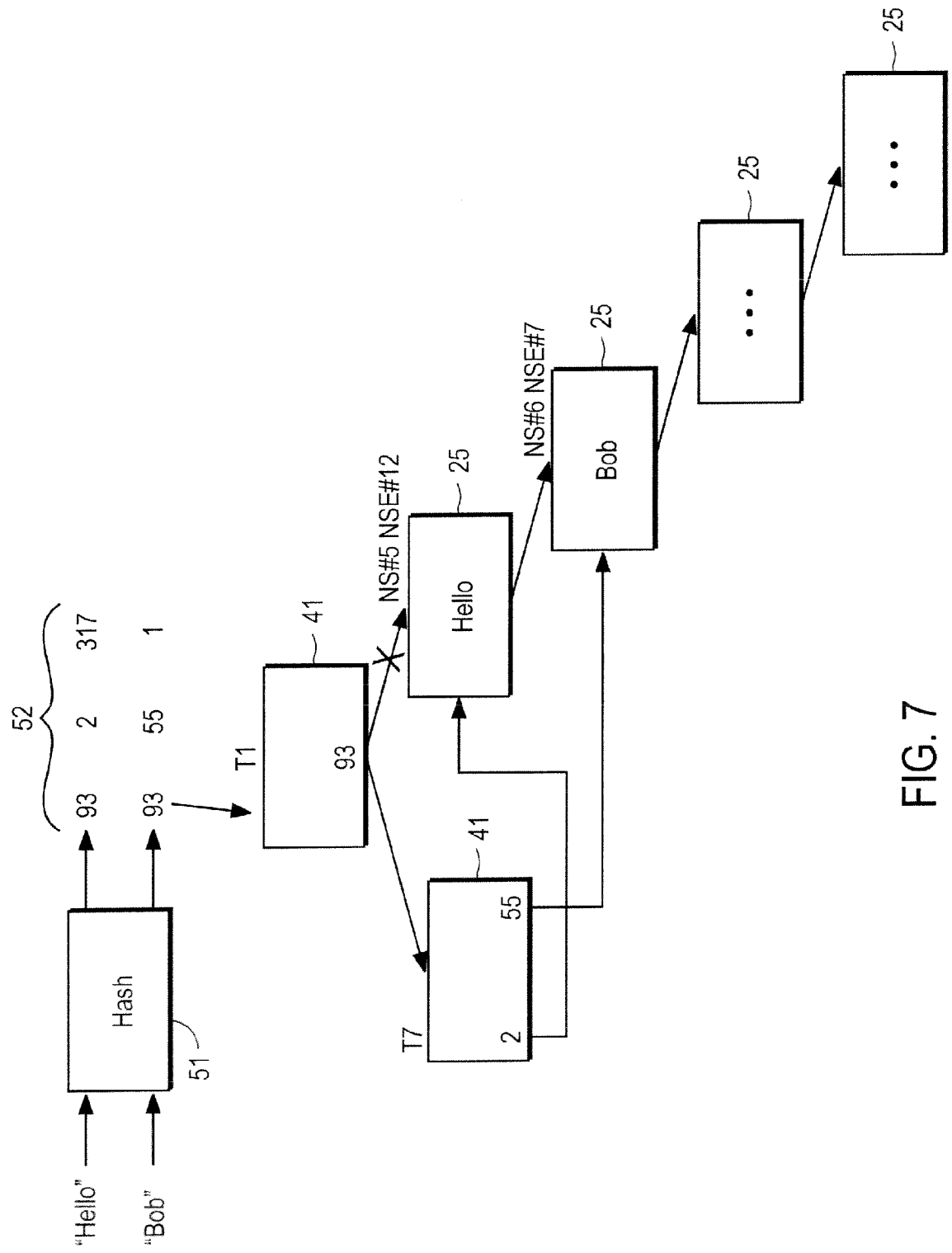

A hash chain of names, such as mentioned above, is only allowed to grow to a predetermined depth, such as five names, for example. Thus, when the file system is about to add a sixth filename onto a hash chain, it reconsiders. As illustrated in FIG. 7, if the chain is hanging off the root tree segment T1, then the file system "splits" the hash chain; that is, the file system allocates a new tree segment 41 (labeled T7 in this example), changes the applicable root tree segment's pointer (pointer #93 in this example) to point to the new tree segment (T7), and then re-hashes the filenames that previously resided under that pointer. This action changes the radix tree from a single-level tree to a two-level tree (since the tree now includes two tree segments 41). All of the filenames that end up using the new tree segment T7 have the same first hash value ("93" in this example). Therefore, the second hash value (i.e., the middle-order P bits) is used instead to find these names.

Assume, for example, that the name "hello" has the value "2" as its second hash value—but the name "squee" has the value "55" as its second hash value, as shown in FIG. 7. Hence, in this second tree segment T7 these two names do not collide. To look up "Bob" now, the file system will still start at the root tree segment T1. The file system consults pointer #93 of tree segment T1, which points to tree segment T7. Therefore, the file system fetches tree segment T7 and looks at its pointer #55. This pointer points to name segment #6, NSE #7, which contains the desired filename, "Bob".

It is also possible to add enough filenames so that the chains on this two-level tree segment will become too long (e.g., more than five names). If that happens, the file system will split those chains in the manner described above to create a third-tier tree segment, keyed by the third hash value (i.e., the lowest-order P bits).

When names are removed from a directory, those names' hash values get removed from the tree segments 41 and corresponding hash chains. If the last entry from a tree segment 41 is removed, that tree segment 41 is then unused. The directory header has a free list 40 (FIG. 3), as mentioned above, which threads together all the tree segments 41 that are unused, so that it can quickly allocate a new tree segment 41 later whenever it needs to.

Figure 8:
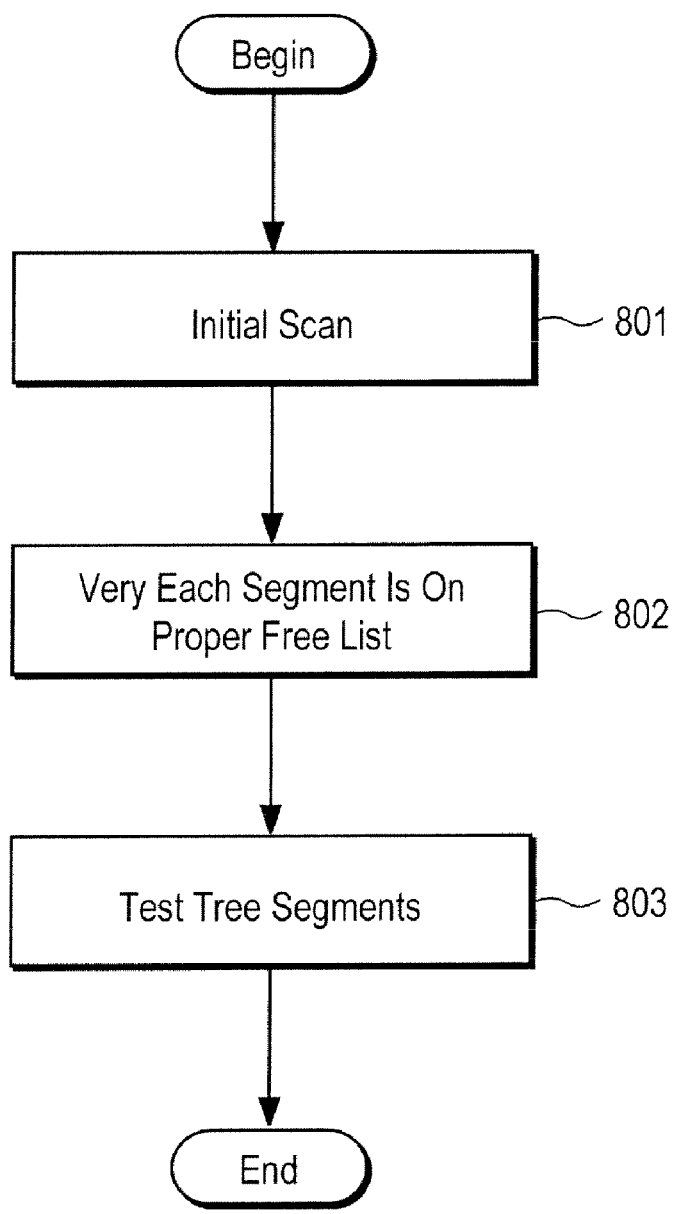
FIG. 8 is a flow diagram of an overall directory validation process performed by a file server.

A technique for validating a directory 21 in accordance with the invention will now be further described with reference to FIGS. 8 through 11. FIG. 8 illustrates the overall directory validation process performed by the file server 122, according to certain embodiments of the invention. This process is repeated for each directory in the storage pool maintained by the file server 122. The process may be initiated by a network administrator, for example, either directly at the file server 122 or from an administrative console (e.g., through a network). Alternatively, the process may be initiated automatically by the file server 122, such as periodically or in response to a predetermined event or condition.

The process begins at block 801 with an initial scan. The initial scan includes validating all of the names in the directory 21 (e.g. making sure the filenames include no invalid characters) and building a table in memory to indicate the free list to which each segment is assigned (if any). The initial scan also performs basic testing on each tree segment, for example, to ensure that a tree segment has no pointers with illegal segment indices. The initial scan further builds in-memory counters of the number of names that are expected to hash underneath each tree segment. After the initial scan, the process verifies at block 802 that each segment is on the proper free list (based on the table created in 801 and the actual number of free entries in that segment).

At block 803, the process tests all tree segments 41 in the directory 21. A major purpose of this test is to determine whether the names in the directory are properly hashed (indexed) into the radix tree. In the prior art, this aspect of validation would be particularly susceptible to accumulated latency due to disk I/Os, as mentioned above. However, described below are further details of this part of the process which, in accordance with the invention, is designed to reduce such disk I/O latency. Also in block 803, any "orphan" or duplicate filenames are identified and corrected. An "orphan" filename is a filename which has not yet been assigned a hash value. If any orphan filenames are found, they are hashed and added to a tree segment. Duplicate filenames generally result in rebuilding the directory.

In accordance with embodiments of the invention, during block 803, the directory's radix tree is divided up (logically) to define two or more subsets of the radix tree. FIG. 9 shows a radix tree 91 for a directory, which has been divided up to form three subsets 92 (the name segments to which each tree segment 41 points are not shown). Each subset 92 is defined as including one or more tree segments 41. The subsets 92 are defined based on the number of names under each tree segment 41. More specifically, the subsets 92 are defined so that, for each subset 92, all of the information required to perform block 803 of the validation process on all names within that subset, can be stored at one time in main memory of the file server 122 (considering the amount of space available in main memory). The size and content of each subset 92 is generally chosen so as to make full use of the available space in main memory, without exceeding that available space.

The term "main memory", as used herein, means the primary memory from which software currently executing in the file server 122 is executed or in which data currently being processed by the file server are normally stored. Main memory is normally a form of random access memory (RAM), although it is possible for other types of memory to be used as main memory. Main memory is to be distinguished from secondary storage, e.g., the storage subsystem (e.g., disks) used for the storage pool and/or for long-term storage of software and data.

In accordance with the invention, it is recognized that validating name hashing (in block 803 of the validation process) does not require the actual names or any portions thereof as input. All that is needed for purposes of this test are, for each name to be tested: the NSE index of the first NSE used by the name, the hash value of the name, and the next-in-hash pointer associated with the name (if applicable). Neither the actual name nor any portion thereof is needed for purposes of verifying the correct hashing. Accordingly, it is unnecessary and wasteful to load an entire name segment into main memory, for purposes of validating the hashing of a particular name.

Figure 10:
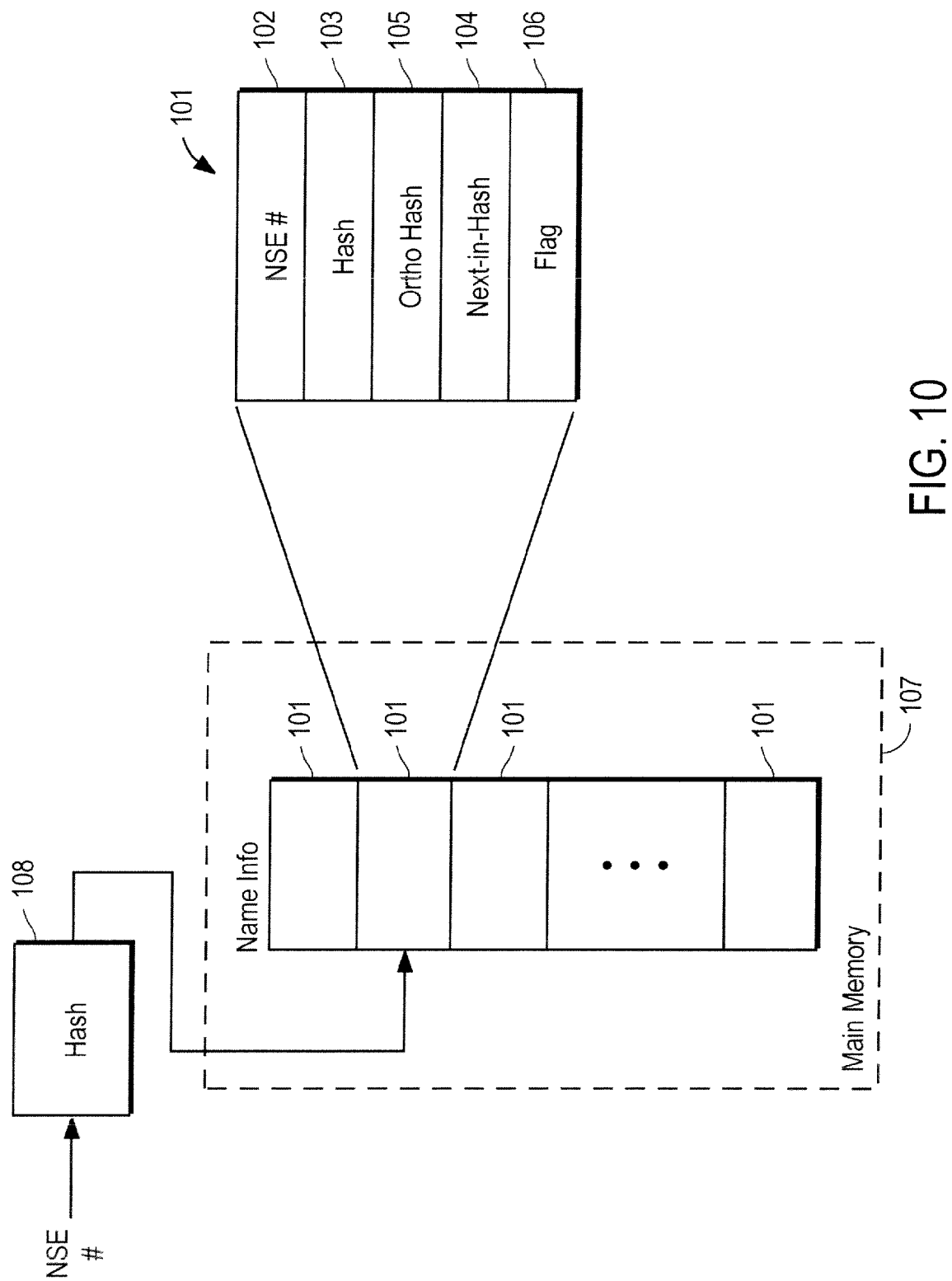
FIG. 10 shows the format and content of a name info object.

Accordingly, for each name in a directory 21, a special object is created to store the above-mentioned information needed for validating the name's hashing (block 803). Each such object is referred to herein as a "name info object", an example of which is illustrated in FIG. 10. A name info object 101 includes a distillation of the information about a name which is needed to validate the name's hashing. As shown in FIG. 10, this distillation includes: 1) the NSE index 102 of the first NSE 25 used to store the name; 2) the hash value 103 of the name (that is, the entire hash value generated by the hashing function 51, i.e., the highest P bits, the middle P bits and the lowest P bits); and 3) the next-in-hash pointer 104 of the name (if any). Validation of the hashing of a name involves simply verifying that the hash value 103 in the name's name info object 101 matches the hash value of the tree segment under which it resides.

As shown in FIG. 10, a name info object 101 also contains other information which is used to facilitate other types of testing. This other information includes a second hash value 105, referred to as the orthogonal ("ortho") hash value 105, and a flag 106. As described further below, the ortho hash value 105 is used to facilitate detection of duplicate names in a directory. The flag 106 is used to detect loops in a hash chain and "orphan" filenames.

For purposes of validating name hashing (in block 803 of FIG. 8), the name info objects 101 are stored in main memory 107 of the file server 122, and only the name info objects are used to validate name hashing; entire name segments 23 are not loaded into main memory 107 from disk for this purpose, nor are the actual names or any portions thereof.

A name info object 101 consumes a known amount of memory space. Assuming the size of main memory 107 is known and the minimum available space in main memory 107 can be reliably predicted for the file server 122, it is straightforward to determine the maximum number of names for which block 803 can be performed at a time (based on the amount of space that would be consumed by their corresponding name info objects 101 in main memory 107). It is possible, therefore, to optimize usage of main memory 107 while reducing disk I/Os, for purposes of validating name hashing.

Specifically, construction of name info objects 101 involves performing disk I/Os in order to iteratively enumerate every segment in the directory. Thus, dividing the directory (i.e., the radix tree 91) into subsets 92 would tend to require more disk I/Os (to test all of the subsets) than if the entire directory were loaded into main memory 107. To reduce the number of required I/Os, therefore, the radix tree 91 is divided into as few subsets 92 as possible, and each subset 92 is made as large as possible, where the size of each subset 92 is bounded by the amount of memory required to hold the name info objects for all of the names in that subset. By reducing the number of disk I/Os required to test most directories, therefore, this approach reduces overall disk I/O latency for, and shortens the duration of, the overall validation process.

Referring still to FIGS. 9 and 10, each name info object 101 is hashed, using a hashing function 108, according to the index of the first NSE used to store that name. When performing block 803, only one subset 92 of the radix tree 91 is tested at a time. The name info objects 101 of all names belonging to a selected subset 92 are created and stored in main memory 107 of the file server, and the test is then performed based on that information, without any need to perform any further disk I/Os to test the names in the selected subset 92. When the next subset 92 is tested, the name info objects 101 for all the names under that subset 92 are created and stored in main memory 107 and then used to perform the test in a similar manner; and so forth, until all subsets 92 of the radix tree 91 have been tested. This process can then be repeated for other directories.

As noted above, each name info object 101 also includes an "ortho" hash value 105 and a flag 106. The ortho hash value 105 is a hash value which results from applying to the filename a hash function different from hash function 51 described above. For example, if the filename is hashed using CRC to produce hash value 103, then ELF hashing may be used to produce the ortho hash value 105. The hash value 103 and the ortho hash value 105 are used together to facilitate identifying duplicate filenames, as described further below.

The flag 106 is used to detect orphaned filenames and to detect loops in the next-in-hash chain, as described below. The flag is set whenever a name's hashing is tested. If the testing process encounters a name info object 101 whose flag 106 is already set before the hashing is tested, this indicates a loop exists in the next-in-hash chain.

Figure 11A:
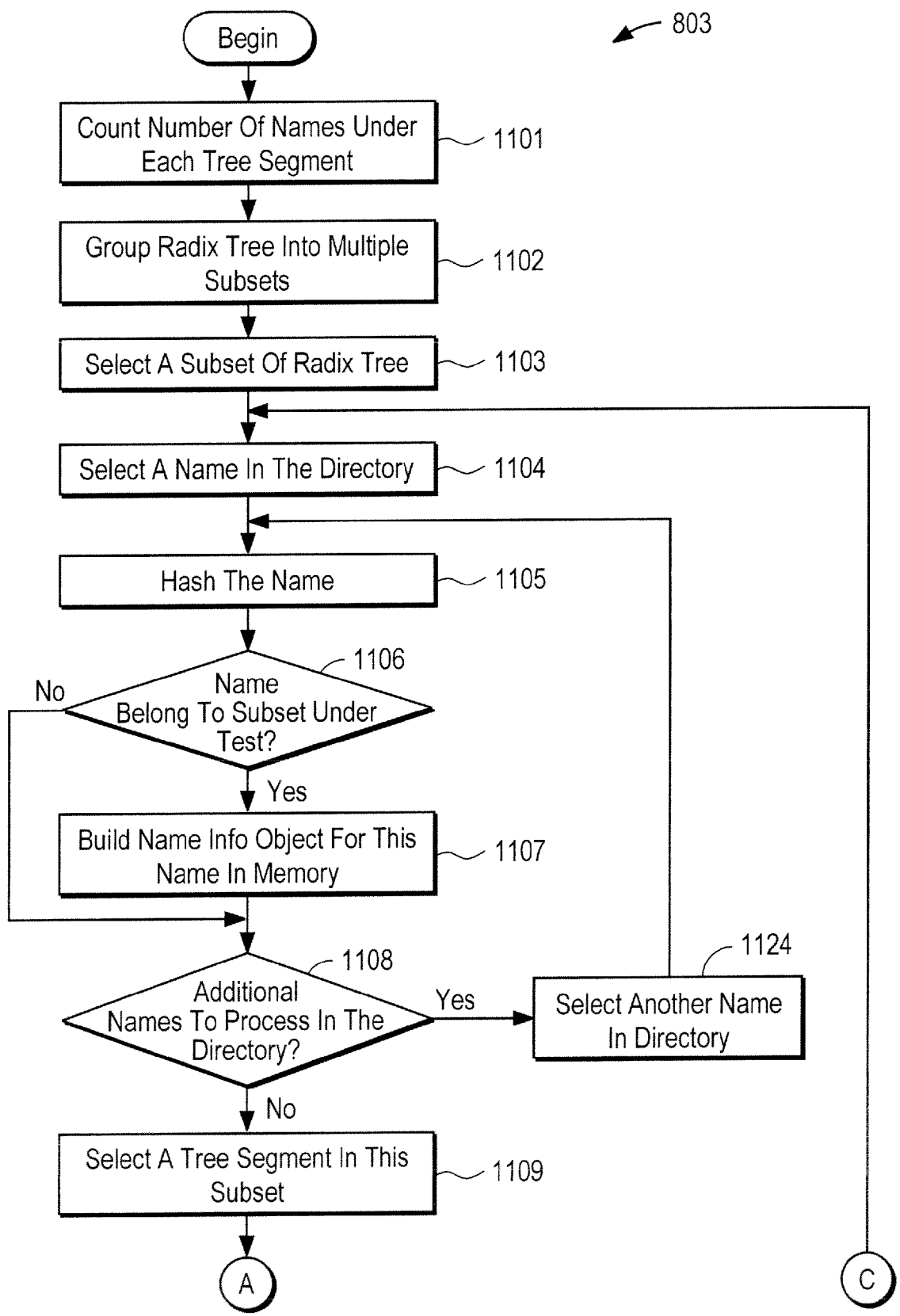
FIGS. 11A, 11B and 11C collectively form a flow diagram showing a process of testing tree segments in a directory.
Figure 11B:
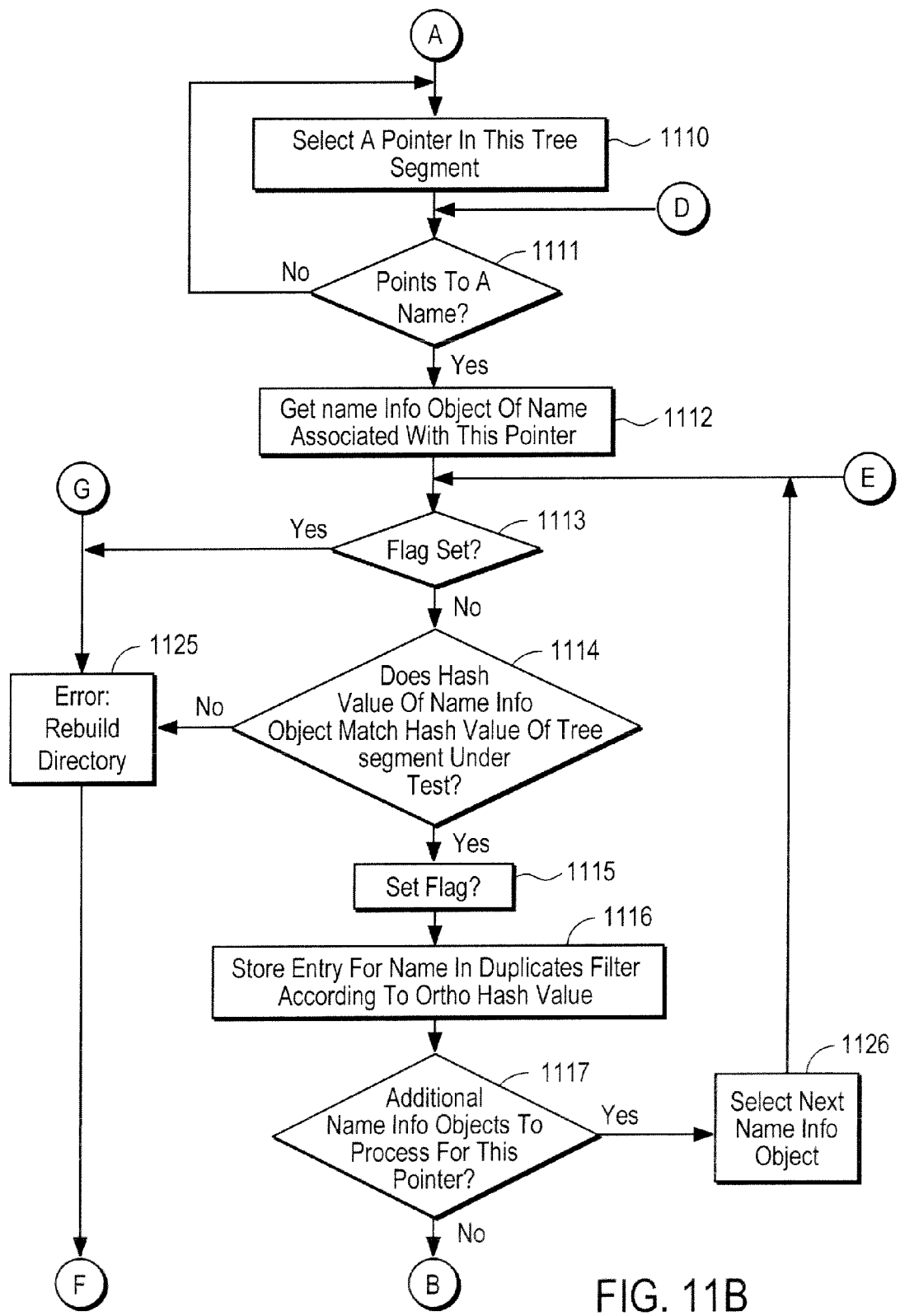
Figure 11C:
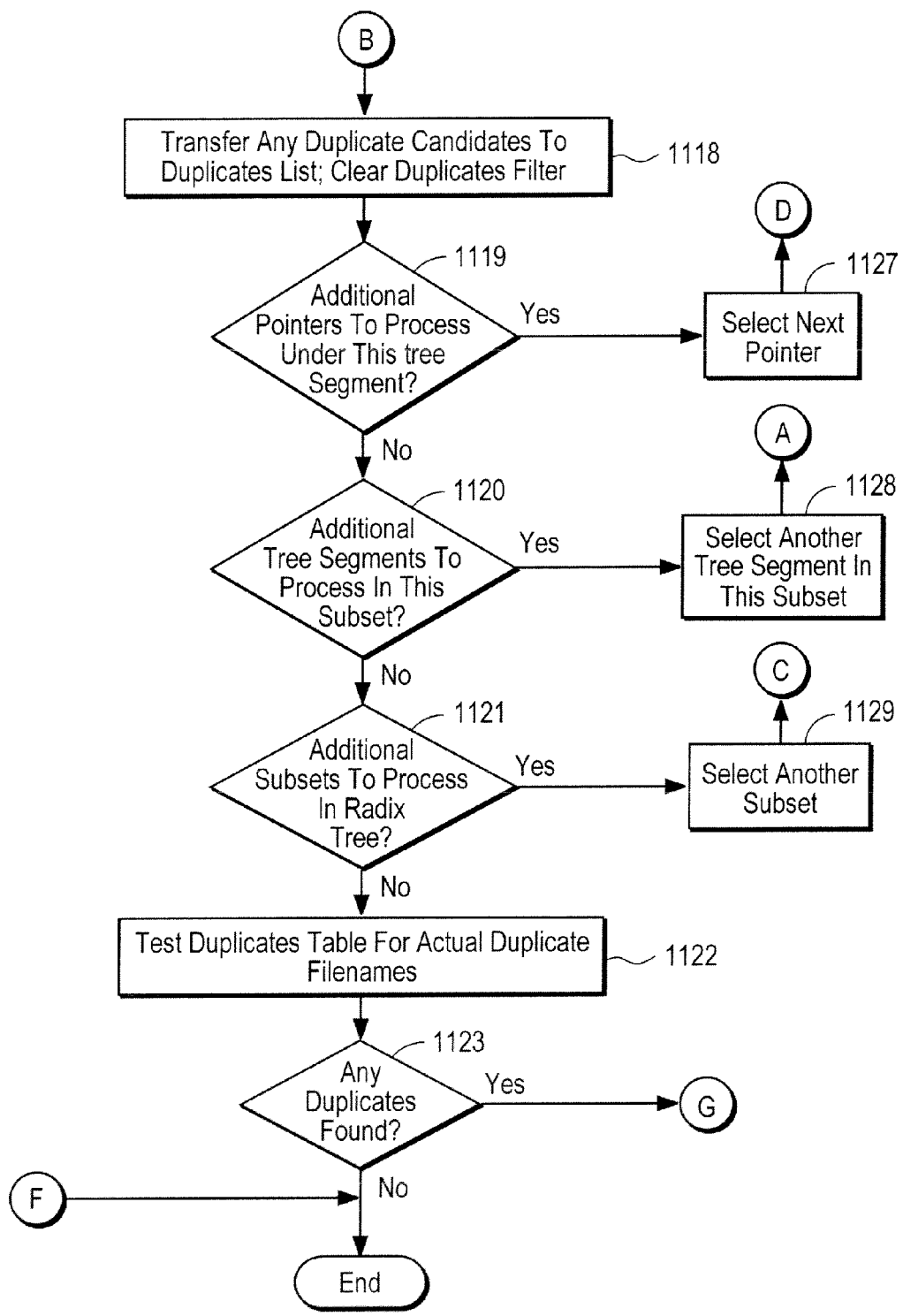

FIGS. 11A, 11B and 11C show the process of block 803 in greater detail, according to certain embodiments of the invention. Initially, at block 1101 the process counts the number of names under each tree segment in the directory. Next, at block 1102 the process groups the radix tree of the directory into multiple subsets in the manner described above (i.e., based on the number of names in each tree segment, memory required, and available memory), assuming the directory is large enough to make dividing it up worthwhile. If the directory is very small, it may not be necessary or desirable to break the radix tree into subsets.

The process next selects one of the defined subsets of the radix tree at block 1103 and, for the selected subset, selects a name in the directory at block 1104. The process then hashes the name using the primary hash function at block 1105. The process then determines at block 1106 whether the name belongs to the currently selected subset, based on the name's hash value. If the name belongs to the currently selected subset, the process then builds a name info object for this name in main memory at block 1107, and the process then continues from block 1108. Otherwise, the process bypasses block 1107 and continues from block 1108. The subprocess represented by blocks 1105 through 1108 is then repeated for each name in the directory, until all names in the directory have been processed in this way (see blocks 1108 and 1124).

After all names in the directory have been processed as described above, the process continues from block 1109, in which a tree segment in the currently selected subset is selected. Next, at block 1110 the process selects a pointer in the selected tree segment. If the pointer points to a name (block 1111), which can be determined from the name/tree field 44 (FIG. 4), then the process continues from block 1112. If the pointer does not point to a name, then the process loops back to block 1110 to select the next pointer in the currently selected tree segment.

If the pointer points to a name, then in block 1112 the process gets the name info object associated with the pointer from main memory (based on the index value of the first NSE of the name, which is stored in the name info object). The process then determines at block 1113 if the flag 106 in that name info object is set. If the flag 106 is set, it means that this name info object has already been seen during this validation testing, which means there is a loop in the current hash chain. In that event, the directory is rebuilt from scratch at block 1125, and the process then ends.

If the flag 106 is not set, the process continues with block 1114. Block 1114 is where the name's hashing is actually validated. At block 1114, the process determines whether the primary hash value 103 in the selected name info object matches the hash value of the currently selected tree segment. If there is no match, then an error has been detected; in that event the directory is rebuilt from scratch at block 1125.

If the hash values match, however, then the hashing for this name is determined to be valid. In that case, at block 1115 the process then sets the flag 106 in the name info object in main memory. Any name for which the flag 106 is not set in its name info object at the end of this process is considered to be an orphan filename. Any orphan filenames are identified and hashed into the radix tree at the end of this process.

After setting the flag 106, at block 1116 the process records an entry for the current name in a data structure, referred to as the duplicates filter, which is used to facilitate detection of duplicate names in a directory, as described further below. The duplicates filter is a table that records the ortho hash values 105 that have been seen while processing a given hash chain. The duplicates filter is only valid while a particular hash chain is being tested, after which it is discarded (cleared).

The duplicates filter is divided into a number of "buckets" (entries), indexed according to the ortho hash values 105 of the names that are tested in a given hash chain. Hence, any two name info objects which have the same ortho hash value 105 will be represented in the same bucket of the duplicates filter. The entry recorded in the duplicates filter at block 1116 includes the index value of the first NSE of the name being tested. The use of the duplicates filter is described further below.

The subprocess represented by blocks 1112 through 1116 is then repeated until all name info objects in the hash chain for the selected pointer have been processed (see blocks 1117 and 1126). This is accomplished by following the next-in-hash pointer 104 (if any) in the name info object 101 after checking the hashing of each name.

After each name in the current hash chain has been processed, then at block 1118 the process transfers information regarding possible duplicate names (if any) from the duplicates filter into another data structure, referred to as the duplicates list. As noted above, any two name info objects from a given hash chain which have the same ortho hash values 105 will be represented in the same bucket of the duplicates filter. Therefore, at block 1118, for any bucket in the duplicates filter which contains more than one NSE index, the NSE indices in that bucket are stored in the duplicates list, after which the duplicates filter is discarded. The duplicates filter is only valid for a particular hash chain, however, the duplicates list may remain valid for the entire directory. The contents of the duplicates list are used in block 1122 to actually detect duplicate names, as explained below.

After block 1118, the aforementioned operations are further repeated until all pointers in the selected tree segment have been processed (see blocks 1119 and 1127), and further until all tree segments in the selected subset have been processed (see blocks 1120 and 1128), and still further until all subsets in the radix tree have been processed (blocks 1121 and 1129).

After all subsets of the radix tree have been processed, at block 1122 the names corresponding to the entries on the duplicates list (if any) are examined to detect any actual duplicates. This operation requires reading the actual names from disk. Consequently, to minimize the number of required disk I/Os, this operation preferably is done once for the entire directory. If no duplicate names are detected (block 1123), the process ends. If any duplicate names are detected (block 1123), the directory is rebuilt at block 1125, and the process then ends.

As noted above, the above described process further can be performed on other directories in the storage pool.

Also as noted, the above-described directory validation technique can be implemented by a file server 122. FIG. 12 shows a simple example of a network environment which incorporates the file server 122. The file server 122 is coupled locally to a storage subsystem 124 which includes a set of mass storage devices, and to a set of clients 121 through a network 123, such as a local area network (LAN). Each of the clients 121 may be, for example, a conventional personal computer (PC), workstation, or the like. The storage subsystem 124 contains the storage pool managed by the file server 122. The file server 122 receives and responds to various read and write requests from the clients 121, directed to data stored in or to be stored in the storage subsystem 124. The mass storage devices in the storage subsystem 124 may be, for example, conventional magnetic disks, optical disks such as CD-ROM or DVD based storage, magneto-optical (MO) storage, or any other type of non-volatile storage devices suitable for storing large quantities of data.

The file server 122 may have a distributed architecture; for example, it may include a separate N-("network") blade and D-(data) blade (not shown). The N-blade is used to communicate with clients 121. The D-blade includes the file system functionality and is used to communicate with the storage subsystem 124. The N-blade and D-blade communicate with each other using an internal protocol. Alternatively, the file server 122 may have a monolithic architecture, such that the network and data components are all contained in a single box. The file server 122 further may be coupled through a switching fabric to other similar file servers (not shown) which have their own local storage subsystems. In this way, all of the storage subsystems can form a single storage pool, to which any client of any of the file servers has access.

FIG. 13 is a block diagram showing the architecture of the file server 122, according to certain embodiments of the invention. Certain standard and well-known components which are not germane to the present invention may not be shown. The file server 122 includes one or more processors 131 and memory 132 coupled to a bus system 133. The bus system 133 is an abstraction that represents any one or more separate physical buses and/or point-to-point connections, connected by appropriate bridges, adapters and/or controllers. The bus system 133, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processors 131 are the central processing units (CPUs) of the file server 122 and, thus, control the overall operation of the file server 122. In certain embodiments, the processors 131 accomplish this by executing software stored in memory 132. A processor 131 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 132 is or includes the main memory 107 of the file server 122. The memory 132 represents any form of random access memory (RAM), read-only memory (ROM), flash memory, or the like, or a combination of such devices. Memory 132 stores, among other things, the operating system 134 of the file server 122, in which the validation techniques introduced above can be implemented.

Also connected to the processors 131 through the bus system 133 are one or more internal mass storage devices 135, a storage adapter 136 and a network adapter 137. Internal mass storage devices 135 may be or include any conventional medium for storing large volumes of data in a non-volatile manner, such as one or more disks. The storage adapter 136 allows the file server 122 to access the storage subsystem 124 and may be, for example, a Fibre Channel adapter or a SCSI adapter. The network adapter 137 provides the file server 122 with the ability to communicate with remote devices such as the clients 121 over a network and may be, for example, an Ethernet adapter.

Figure 14:
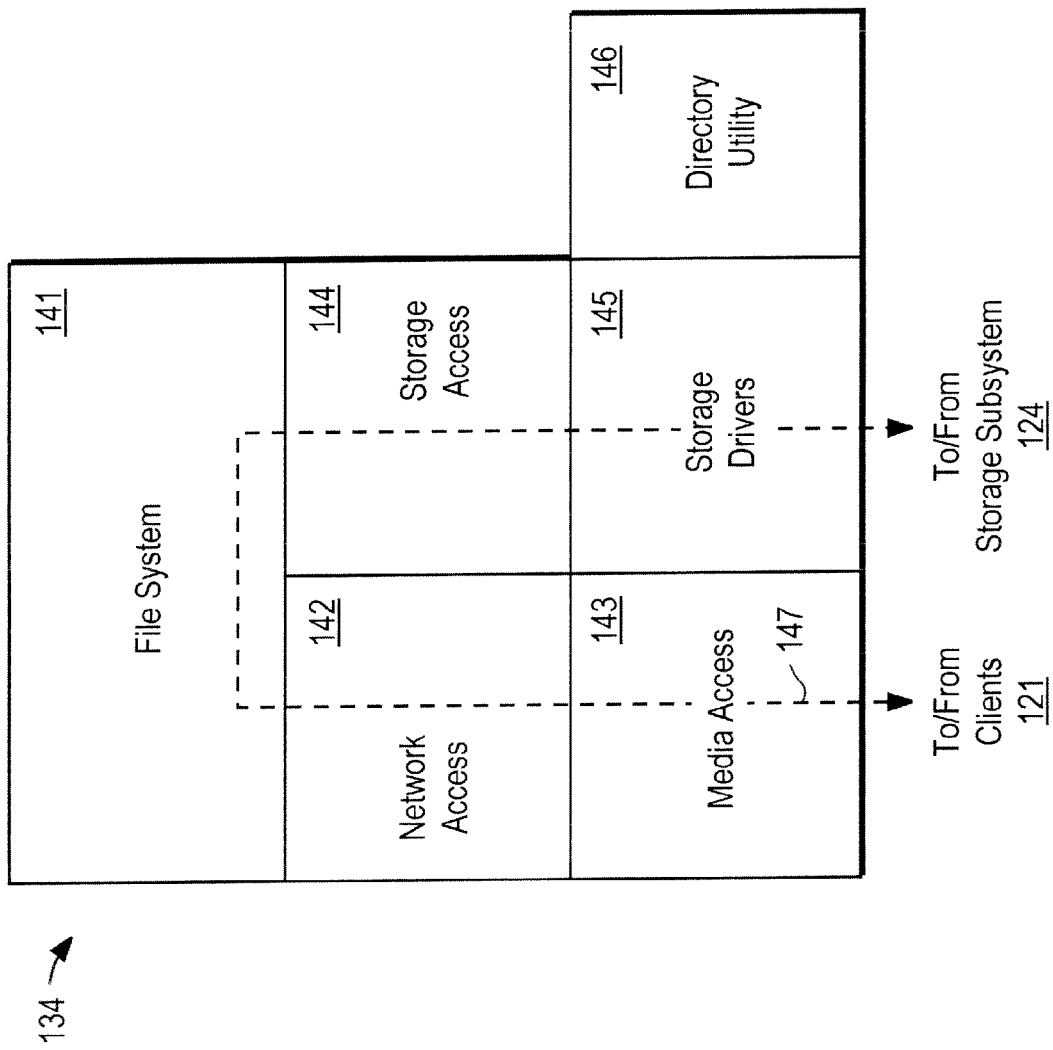
FIG. 14 is a block diagram showing the operating system of a file server that implements the invention.

FIG. 14 shows an example of the operating system of a file server that may be used to implement techniques described above. As shown, the operating system 134 of the file server 122 includes several modules, or layers. These layers include a file system 141, which executes read and write operations on the disks in the storage subsystem 134 in response to client requests, maintains directories of stored data, etc. "Under" the file system 1411 (logically), the operating system 134 also includes a network access layer 142 and an associated media access layer 143, to allow the file server 2 to communicate over a network (e.g., with clients 1). The network access 142 layer may implement any one or more of various protocols, such as NFS, CIFS, HTTP and/or TCP/IP. The media access layer 143 includes one or more drivers which implement one or more protocols to communicate over the network, such as Ethernet.

Also logically under the file system 141, the operating system 134 includes a storage access layer 144 and an associated driver layer 145, to allow the file server 122 to communicate with the storage subsystem 124. The storage access layer 144 implements a disk storage protocol such as RAID, while the driver layer 145 implements a lower-level storage device access protocol, such as Fibre Channel Protocol (FCP) or SCSI. Also illustrated in FIG. 14 is the path 147 of data flow through the operating system 134, between a client 121 and the storage subsystem 124. The details of the above-mentioned layers of the operating system 134 are not necessary for an understanding of the invention and, hence, need not be described herein.

The operating system 134 further includes a directory utility 146, which implements the directory validation func-
tionality described above. The directory utility 146 has access to the storage subsystem 124 through the storage driver layer 145.

Note that the directory validation technique introduced herein is not limited in application to file servers. For example, the technique can be adapted for use in other types of storage servers, such as block based storage servers or processing systems other than storage servers. Furthermore, the technique introduced herein can be adapted for purposes other than validation of directories. A virtual phone book is one possible example: Fast lookup of a particular name in an electronic phone book could be implemented by using a large radix tree, and the names of individuals in the phone book could be tested to ensure they are properly hashed into the tree by using the algorithm introduced above or an adaptation thereof. It will be recognized that many other applications of the present invention are possible.

Thus, a method and apparatus for testing a directory of information stored in a storage server have been described. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:
   storing, in a processing system, a tree structure that includes a plurality of information-containing segments for use in facilitating lookups of names in a directory, the plurality of information-containing segments including a plurality of name segments, each of the plurality of name segments storing a name of information stored in the directory, wherein each of the plurality of name segments includes at least one name segment entry, each said name segment entry containing at least a portion of a name of information stored in the directory;
   grouping the plurality of information-containing segments to form a plurality of subsets of the tree structure, wherein each subset is sized based on an amount of memory that will be required to store a predetermined distillation of information about names in the subset, wherein each said distillation includes a plurality of name information objects, each name information object containing a name segment entry index and a first hash value of a name associated with the name information object, and wherein at least one of the plurality of subsets includes more than one information-containing segment of the plurality of information-containing segments;
   selecting a subset of the plurality of subsets;
   creating a distillation of information for names in the selected subset;
   storing in the memory the distillation of information for names in selected subset;
   performing a predetermined test on only the selected subset by using only the distillation of information stored in the memory to determine whether there is an error in the processing system; and
   repeating said selecting, creating, said storing, and said performing, for each of the other subsets of the plurality of subsets of the tree structure.

2. A method as recited in claim 1, wherein each of the segments references a plurality of names, and wherein the predetermined test comprises, for each segment in the selected subset, verifying that the names associated with the segment are properly indexed into the tree structure.

3. A method as recited in claim 1, wherein the plurality of segments further comprises a plurality of tree segments, at least one of the tree segments containing a pointer to at least one of the name segments.

4. A method as recited in claim 3, wherein grouping the plurality of information-containing segments comprises grouping the plurality of tree segments to form a plurality of subsets of the tree, based on the number of names associated each tree segment and an amount of available space in the memory.

5. A method as recited in claim 1, wherein the predetermined distillation of information does not include any portion of a name of information stored in the directory.

6. A method as recited in claim 5, wherein each of the name information objects further contains a second hash value, the method further comprising using the second hash value in at least two of the name information objects to detect duplicate names in the directory.

7. A method as recited in claim 1, wherein the predetermined test comprises, for each of a plurality of names associated with the selected subset, verifying that the name is properly hashed into the tree structure.

8. A method as recited in claim 7, wherein the hash value represents a result of applying a hashing function to a name of information stored in the directory.

9. A method as recited in claim 1, wherein the distillation of information for the selected subset comprises a plurality of name information objects, each name information object containing a name segment entry index and a first hash value for a corresponding name of information stored in the directory.

10. A method as recited in claim 9, wherein the first hash value represents a result of applying a hashing function to the corresponding name.

11. A method as recited in claim 9, wherein the distillation of information does not include any portion of a name of information stored in the directory.

12. A method as recited in claim 9, wherein the predetermined test comprises, for each of a plurality of names associated with the selected subset, validating the first hash value in one or more corresponding name information objects.

13. A method as recited in claim 9, wherein each of the name information objects further contains a second hash value, the method further comprising using the second hash value in at least two of the name information objects to detect duplicate names in the directory.

14. A method as recited in claim 1, wherein the processing system is a storage server.

15. A storage system comprising:
a processor;
a memory accessible to the processor;
a network interface through which to receive a plurality of client requests to access data stored in an array of mass storage devices;
a storage interface through which to access the array of mass storage devices;
a directory of information stored in the array of mass storage devices, wherein the directory is represented by a plurality of name segments, each of the plurality of name segments storing a name in the directory;
a tree containing a plurality of information-containing segments associated with the directory, wherein the tree comprises a plurality of tree segments, at least one of the tree segments containing a pointer to at least one of the name segments; and
sequences of instructions which, when executed by the storage system, cause the storage system to perform a process for testing the directory, the process comprising
grouping the plurality of information-containing segments to form a plurality of subsets of the tree, based on an amount of memory required to store information during a predetermined test, wherein at least one of the plurality of subsets includes more than one information-containing segment of the plurality of information-containing segments, including grouping the plurality of tree segments to form a plurality of subsets of the tree, based on the number of names associated with each tree segment and an amount of available space in the memory;
selecting a subset of the plurality of subsets;
creating the information for the selected subset;
storing the information for the selected subset in the memory;
performing the predetermined test on only the selected subset using only the information stored in the memory; and
repeating said selecting, said creating, said storing, and said performing, for each of the other subsets of the plurality of subsets of the tree.

16. A storage system as recited in claim 15, wherein the predetermined test comprises verifying that names associated with each segment in the subset are properly hashed into the tree.

17. A storage system as recited in claim 15, wherein the information comprises information about names associated with the selected subset.

18. A storage system as recited in claim 17, wherein each of the plurality of name segments comprises at least one name segment entry, each name segment entry containing at least a portion of a name of information stored in the directory, and wherein the predetermined set of information for the selected subset comprises a plurality of name information objects, each containing a name segment entry index and a hash value for a corresponding name segment entry.

19. A storage system as recited in claim 18, wherein the information does not include any portion of a name of information stored in the directory.

20. A storage system as recited in claim 15, wherein the predetermined test comprises, for each of a plurality of names associated with the selected subset, verifying that an indexing of a plurality of names into the tree is correct.

21. A storage system as recited in claim 20, wherein the indexing represents a result of applying a hashing function to the names.

22. A storage system as recited in claim 15, wherein the information for the selected subset comprises a plurality of name information objects, each name information object containing a name segment entry index and a first hash value for a portion of the subset.

23. A storage system as recited in claim 22, wherein the first hash value represents a result of applying a hashing function to a name of information stored in the directory.

24. A storage system as recited in claim 22, wherein the information does not include any portion of a name of information stored in the directory.

25. A storage system as recited in claim 22, wherein the predetermined test comprises, for each of a plurality of names associated with the selected subset, validating the first hash value in one or more corresponding name information objects.

26. A storage system as recited in claim 22, wherein each of the name information objects further contains a second hash value, the method further comprising using the second hash value in at least two of the name information objects to detect duplicate names in the directory.

* * * * *